United States Patent Office

2,786,839
DIHYDRAZINODIAZINE DERIVATIVES

Werner Zerweck and Wilhelm Kunze, Frankfurt am Main Fechenheim, Germany, assignors to Cassella Farbwerke Mainkur Aktiengesellschaft, Frankfurt am Main Fechenheim, Germany, a German company No Drawing. Application June 30, 1954,
Serial No. 440,534

Claims priority, application Germany July 13, 1953

2 Claims. (Cl. 260—250)

This invention relates to the production of dihydrazinodiazine derivatives.

We have found that an iminoindolenine which contains in the indole ring a substituent capable of substitution is readily converted by at least 3 moles of hydrazine to form the corresponding dihydrazinodiazine derivative, ammonia being split off. The reaction proceeds according to the following scheme

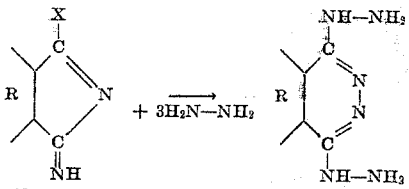

wherein X means a substituent capable of substitution, such as an amino, alkoxy, or mercapto group, and R means an aromatic or heterocyclic ring.

Of a special value are those of these compounds which correspond to the general formula

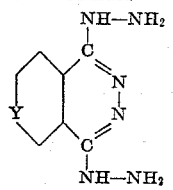

wherein Y means a ring member of the group consisting of CH and N.

Advantageously, the reaction is performed with an addition of a weak acid and at temperatures not exceeding 100° C.

This course of the reaction is surprising because generally the five-membered heterocyclic ring is stable or is produced at the mild reaction conditions used in the present process. The process of the invention as compared to known methods based e. g. on arylene-o-dinitrile, means a technical advance because it is in many cases easier to produce from the arylene-o-dicarboxylic acids the imino-isoindolenines than the o-dinitriles.

The dihydrazinodiazine derivatives obtained according to this process are useful as therapeutical substances or as intermediates for the production of therapeutical substances and dyestuffs.

The amino-imino-isoindolenine used as a starting material may be obtained, e. g., from a dicarboxylic acid anhydride with urea and ammonium nitrate as described in German Patent No. 879,100.

The following examples are given for the purpose of illustrating the invention, the parts being by weight and all temperatures in degrees centigrade.

Example 1

145 parts of 1-amino-3-imino-isoindolenine are introduced into 300 parts of 80% hydrazine. While cooling, 50 parts of acetic acid are added. The reaction mixture is then stirred at 95°-100° for about 3 hours. Thereby a lively liberation of ammonia occurs, at the same time the 1.4-dihydrazinophthalazine being separated as a thick crystal paste in a very good yield. After cooling to room temperature, filtering by suction, and washing with water, the product is recrystallized from water. It is then obtained in the form of colorless needles of a melting point of 189° (with decomposition). The product is identical with the compound obtained according to British Patent 707,337.

Example 2

174 parts of 1-ethoxy-3-imino-isoindolenine are introduced into 300 parts of 80% hydrazine. Under good cooling and during about 1 hour, 50 parts of acetic acid are added, whereupon the mixture is slowly heated to 70°-75°. At this temperature a lively development of ammonia occurs, which is moderated by cooling the mixture slightly. The reaction is completed by stirring for further 2 hours at 80°. The 1.4-dihydrazinophthalazine obtained in a very good yield is filtered by suction, washed and recrystallized from water.

Example 3

20.8 parts of 1-amino-3-imino-isoindolenine nitrate are introduced, at +20° and during ½ hour, into 40 parts of 80% hydrazine hydrate. During one hour, the reaction mixture is heated to 95° and stirred for 3 hours at this temperature. The 1.4-dihydrazinophthalazine separated as a thick crystal paste is filtered by suction, washed with little cold water and recrystallized from water. It is identical with the product of the Examples 1 and 2.

Example 4

15 parts of phthalimide are introduced together with 17.5 parts of urea, 9 parts of ammonium nitrate and 0.05 part of ammonium molybdate into 50 parts of trichlorobenzene. The mixture is stirred for 10 hours at 170°. After cooling to room temperature and removing the substance that has sublimed to the cooler, 30 parts of 80% hydrazine hydrate are introduced at 50° during one hour, followed by stirring for 1 hour at 70° and 3 hours at 95°. The reaction product, formed under splitting off of ammonia, is isolated by filtering with suction and washing with benzene and methanol, and is recrystallized from water. As shown by its properties, it is identical as 1.4-dihydrazinophthalazine with the products of the Examples 1 to 3.

Example 5

15 parts of phthalic anhydride are introduced together with 30 parts of urea, 16 parts of ammonium nitrate and 0.1 part of ammonium molybdate into 40 parts of trichlorobenzene. The reaction mixture is stirred for 1 hour at 140°, 1 hour at 150°, 1 hour at 160° and 16 hours at 170°. After cooling to 50° and removing the product that has sublimed to the cooler, 30 parts of 80% hydrazine are introduced, and the reaction mixture is stirred for 1 hour at 75° and 3 hours at 95°. After cooling to room temperature, the reaction product is filtered by suction, washed with benzene and methanol, and recrystallized from water. The 1.4-dihydrazinophthalazine thus obtained is identical with the product of the preceding example.

Example 6

146 parts of 1-amino-3-imino-5-aza-isoindolenine of the formula

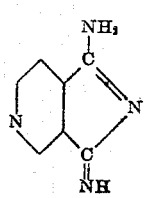

(or the tautomeric mixture of the 5-aza and 6-aza compounds obtainable from pyridine-3.4-dicarboxylic acid) obtainable by a process analogous to that described in German Patent No. 879,100 are introduced into 300 parts of 80% hydrazine hydrate at 20°. After adding about 50 parts of acetic acid at 20°–30°, the reaction mixture is heated to 90°–95° with stirring and maintained at this temperature for 3 hours. The crystalline reaction product separates under liberation of ammonia. After cooling to room temperature, it is filtered by suction and washed with water. The 1.4-dihydrazino-6-azaphthalazine thus obtained corresponds to the formula

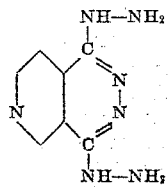

It represents crystals difficultly soluble in water and possessing a melting point of 200° (with decomposition). The crude product is purified by dissolving it in diluted hydrochloric acid, filtering the solution and separating the hydrazine compound by adding aqueous ammonia. From the hydrochloric solution, upon addition of concentrated hydrochloric acid there crystallizes the trihydrochloride of a decomposition point of 190°. The dihydrochloride and the sulfate are easily soluble in water.

We claim:
1. Process which comprises acting with 3 moles of hydrazine on an iminoisoindolenine of the general formula

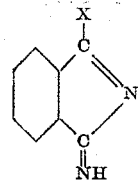

wherein X is a radical selected from the group consisting of amino, alkoxy and mercapto.

2. Process which comprises acting with 3 moles of hydrazine on 1-amino-3-imino-isoindolenine of the formula

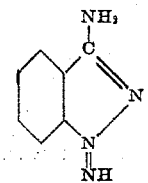

in the presence of a weak acid and at temperatures not exceeding 100° C.

No references cited.